(12) United States Patent
Prakasam

(10) Patent No.: US 7,630,440 B2
(45) Date of Patent: Dec. 8, 2009

(54) CONTEXT ADAPTIVE BINARY ARITHMETIC CODE DECODING ENGINE

(75) Inventor: Ramkumar Prakasam, Santa Clara, CA (US)

(73) Assignee: Broadcom Corporation

( * ) Notice: Subject to any disclaimer, the term of this patent is extended or adjusted under 35 U.S.C. 154(b) by 867 days.

(21) Appl. No.: 10/897,546

(22) Filed: Jul. 23, 2004

(65) Prior Publication Data

US 2004/0268329 A1 Dec. 30, 2004

Related U.S. Application Data

(63) Continuation-in-part of application No. 10/854,592, filed on May 26, 2004.

(60) Provisional application No. 60/474,080, filed on May 28, 2003.

(51) Int. Cl.
*H04N 7/12* (2006.01)
*G06K 9/46* (2006.01)

(52) U.S. Cl. .................. 375/240.25; 382/247
(58) Field of Classification Search ............ 375/240.01, 375/240.25; 382/107, 247; 712/201; 341/50, 341/67; 718/102
See application file for complete search history.

(56) References Cited

U.S. PATENT DOCUMENTS 6,643,387 B1 * 11/2003 Sethuraman et al. ........ 382/107
6,856,701 B2 * 2/2005 Karczewicz et al. ........ 382/247
6,889,310 B2 * 5/2005 Cismas ...................... 712/201
6,919,828 B2 * 7/2005 Jeon et al. .................... 341/67
7,140,018 B1 * 11/2006 Beatty et al. ................ 718/102
2004/0066852 A1 * 4/2004 MacInnis ............... 375/240.25
2005/0219069 A1 * 10/2005 Sato et al. .................... 341/50

* cited by examiner

*Primary Examiner*—Gims S Philippe
(74) *Attorney, Agent, or Firm*—McAndrews, Held & Malloy, Ltd.

(57) ABSTRACT

Methods and systems for selecting contexts during decoding of arithmetic code are disclosed. Aspects of the method may comprise assigning a plurality of default context identifiers to a plurality of current syntax elements within a current macroblock. A plurality of adjacent context identifiers may be acquired, where the adjacent context identifiers may be associated with a plurality of syntax elements within at least one macroblock adjacent to the current macroblock. At least one of the plurality of adjacent context identifiers may be selected utilizing at least one of the default context identifiers. Each of the default context identifiers may comprises a binary value. A top-adjacent context identifier associated with a syntax element within a top-adjacent macroblock to the current macroblock may be acquired. A left-adjacent context identifier associated with a syntax element within a left-adjacent macroblock to the current macroblock may be acquired.

30 Claims, 9 Drawing Sheets

CONTEXT ADAPTIVE BINARY ARITHMETIC CODE DECODING ENGINE

RELATED APPLICATIONS

This application is a continuation-in-part of U.S. patent application Ser. No. 10/854,592 filed on May 26, 2004, entitled "Context Adaptive Binary Arithmetic Code Decoding Engine." U.S. patent application Ser. No. 10/854,592 makes reference to, claims priority to, and claims the benefit of U.S. Provisional Patent Application 60/474,080 filed on May 28, 2003, entitled "Context Adaptive Binary Arithmetic Code Decoding Engine," the complete subject matter of which is hereby incorporated herein by reference, in its entirety.

This application makes reference to U.S. patent application Ser. No. 10/273,515, filed on Oct. 18, 2002, entitled "System and Method for Transcoding Entropy-Coded Bitstreams," which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

As an efficient coding and compression tool, Context Adaptive Binary Arithmetic Coding (CABAC) is used extensively in AVC (or JVT), as described in Draft ITU-T Recommendation and Final Draft International Standard of Joint Video Specification (ITU-T Rec. H.264| ISO/IEC 14496-10 AVC), March 2003. When enabled, all syntax elements below slice header layer are coded using CABAC in AVC.

The following are operations involved in decoding CABAC-coded streams:

Initialization—the decoding engine is first initialized using already decoded properties about a slice. Range division variables used in the decoding engine are initialized to known values and the context model variables are also initialized.

Binarization—Each syntax element to be decoded is expressed in a variable length code at the encoder side and the process of converting a fixed-length code to a variable length code is called binarization. The purposes of employing binarization are to assign a string of bits to syntax elements with more than two possible values, and to assign shorter codes to the more probable values for the syntax element. At the decoder side, a de-binarization process is applied so that the original fixed-length syntax element can be recovered.

Symbol Decoding—The basic element that CABAC is dealing with is a binary bit value of '1' or '0' (referred to as a bin). A binarized syntax element would have a string of such binary bits and each such bit is called a symbol in CABAC. Each symbol of a syntax element is decoded individually with a probability model associated with the symbol. In CABAC, a symbol may have several models (or contexts) associated with it and the model selection is based on adjacent macroblock properties. A table-based approach is employed in CABAC to decode a symbol that, in principle, emulates the range subdivision algorithm as developed in "Arithmetic Coding for Data Compression", Communications of the ACM, Vol. 30, No. 6, June 1987, by Ian H Witten, et. al. and "Arithmetic Coding Revisited", ACM Transactions on Information Systems, Vol. 16, No. 3, July 1998, pp. 256-294, each of which are incorporated herein by reference, and that uses symbol probability models as variables.

Model Update—After a symbol is decoded, the probability model (or context model) will be updated based on the decoded value of the symbol. So next time when the same symbol is decoded again using the same context model, the probability values will be different. Through this, an adaptive model updating is being achieved.

Reference management—The context selection for certain binary bits (bins) in a syntax element are based on the values of previously decoded syntax elements in geometrically adjacent left and top macroblocks. When AFF (adaptive frame-field) is enabled for a bit stream, every macroblock pair can be either frame or field coded. There is a set of rules that need to be followed based on the properties of the current macroblock pair and the adjacent ones in order to derive the reference value associated with a geometrically adjacent block/macroblock. These references are in turn used to calculate the context associated with the bin-to-be decoded.

There are several difficulties with CABAC. Among them are:

Each binarized symbol bit (or bin) is decoded one at a time and involves invoking the range subdivision algorithm.

Each bin involves selection of a context and updating the context at the end of the decoding of the bin.

Various bins of a syntax element may use different context selection criteria.

Different syntax elements use different binarization schemes.

Initialization of all the context-models takes a lot of processing because of the large number of context models involved.

Certain bins for a syntax element have multiple contexts associated with them. The context to be used for those bins is calculated based on previously decoded syntax elements in geometrically adjacent macroblocks and macroblock pairs. The storage structure of the decoded syntax elements for different macroblocks and macroblock pairs and selection of the appropriate reference and calculation of the context to be used are both inherently complex.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a method and system for selecting contexts during decoding of arithmetic code. Aspects of the method may comprise assigning a plurality of default context identifiers to a plurality of current syntax elements within a current macroblock. A plurality of adjacent context identifiers may be acquired, where the adjacent context identifiers may be associated with a plurality of syntax elements within at least one macroblock adjacent to the current macroblock. At least one of the plurality of adjacent context identifiers may be selected utilizing at least one of the default context identifiers.

Each of the default context identifiers may comprises a binary value. A top-adjacent context identifier associated with a syntax element within a top-adjacent macroblock to the current macroblock may be acquired. A left-adjacent context identifier associated with a syntax element within a left-adjacent macroblock to the current macroblock may be acquired. A final context identifier may be generated utilizing said selected adjacent context identifiers. At least one of the syntax elements may be decoded utilizing the generated final context identifier.

A current context identifier may be generated for the decoded current syntax element. The default context identifiers may be post-processed, if the decoded current syntax element comprises an mb_skip_flag or mb_type syntax element. The default context identifiers may be updated for at least one of cbp_luma, cbp_chroma and coded_block_flag syntax elements, if said decoded current syntax element comprises an mb_skip_flag or mb_type syntax element. The plurality of default context identifiers may be updated utilizing the generated current context identifier.

Another aspect of the invention may provide a machine-readable storage, having stored thereon, a computer program having at least one code section executable by a machine, thereby causing the machine to perform the steps as described above for selecting contexts during decoding of arithmetic code.

The system for selecting contexts during decoding of arithmetic code may comprise at least one processor that assigns a plurality of default context identifiers to a plurality of current syntax elements within a current macroblock. A selector may acquires a plurality of adjacent context identifiers, where the plurality of adjacent context identifiers may be associated with a plurality of syntax elements within at least one macroblock adjacent to the current macroblock. The selector may select at least one of the plurality of adjacent context identifiers utilizing at least one of the plurality of default context identifiers. Each of the plurality of default context identifiers may comprise a binary value.

The selector may acquire a top-adjacent context identifier associated with a syntax element within a top-adjacent macroblock to the current macroblock. The selector may acquire a left-adjacent context identifier associated with a syntax element within a left-adjacent macroblock to the current macroblock. A context generator may generate a final context identifier utilizing the selected adjacent context identifiers. A decoder may decode at least one of the plurality of current syntax elements utilizing the generated final context identifier. The processor may generate a current context identifier for the decoded current syntax element.

A post-processor may post-process the plurality of default context identifiers, if the decoded current syntax element comprises an mb_skip_flag or mb_type syntax element. The post-processor may update the plurality of default context identifiers for at least one of cbp_luma, cbp_chroma and coded_block_flag syntax elements, if the decoded current syntax element comprises an mb_skip_flag or mb_type syntax element. The post-processor may update the plurality of default context identifiers utilizing the generated current context identifier.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
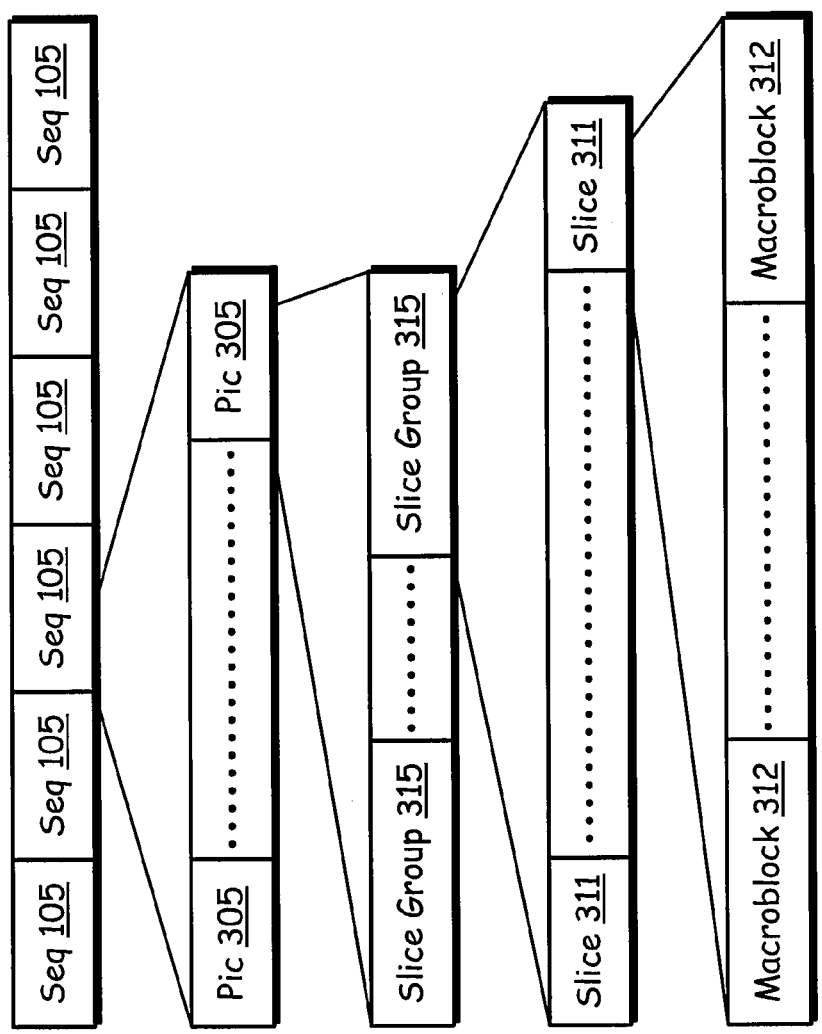
FIG. 1 is a block diagram of the AVC video stream hierarchy.

Referring now to FIG. 1, there is illustrated a block diagram of an Advanced Video Coding (AVC) stream hierarchy of a video stream that may be encoded using CABAC encoding. A video sequence 105 includes an encoded representation of a series of pictures 305. The pictures 305 are divided into slice groups 315, wherein each slice group 315 includes one or more slices 311, and each slice 311 contains any number of encoded macroblocks 312.

In AVC, the macroblocks 312, forming a slice group 315, are not necessarily spatially contiguous. Slice groups 315 may include macroblocks 312 that are throughout the entire picture 305 with macroblocks 312 from other slices groups 315 interspersed therebetween. The foregoing is known as Flexible Macroblock Ordering.

Figure 2:
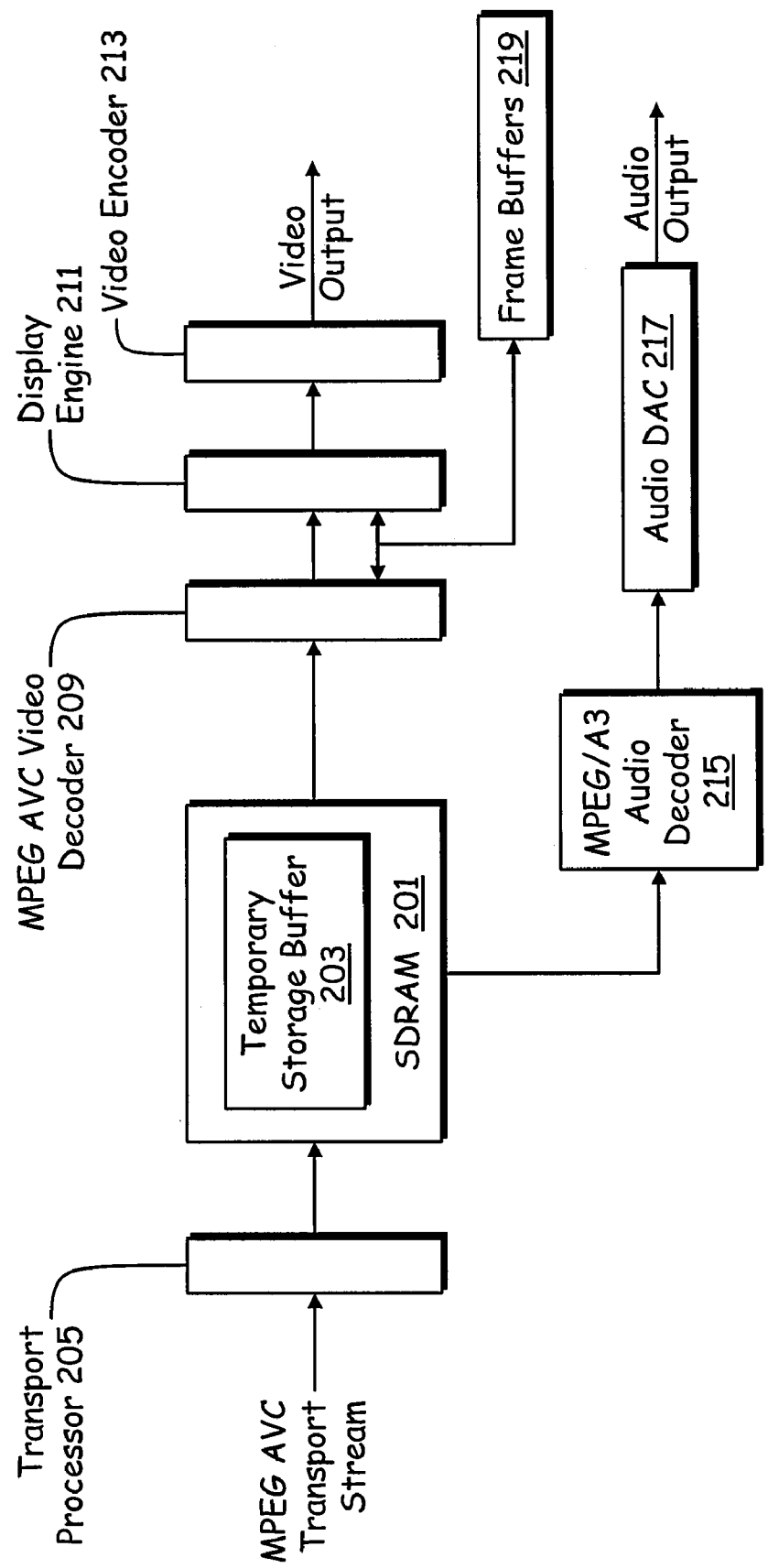
FIG. 2 illustrates a block diagram of an exemplary circuit for decoding compressed video data utilizing an MPEG AVC video decoder, in accordance with an embodiment of the invention.

FIG. 2 illustrates a block diagram of an exemplary circuit for decoding compressed video data utilizing an MPEG AVC video decoder, in accordance with an embodiment of the present invention. Data is received and processed in a transport processor 205. The data can be received from either a communication channel or from a local memory, such as, for example, a hard disc or a DVD. In addition, the video data may be compressed using different entropy coding methods, for example, CABAC encoding. The transport processor 205 demultiplexes the transport stream into stream constituents.

The data output from the transport processor 205 may then be passed to a temporary storage buffer 203 within a Synchronous Dynamic Random Access Memory (SDRAM) 201. Audio stream data from the temporary storage buffer 203 passes to an audio decoder 215 and the video stream data passes to a MPEG AVC video decoder 209. The audio data is then sent to the output blocks, and the video is sent to a display engine 211.

The display engine 211 scales the video picture, renders the graphics, and constructs the complete display. Once the display is ready to be presented, it is passed to a video encoder 213 where it is converted to analog video using an internal digital to analog converter (DAC). The digital audio is converted to analog in an audio digital to analog converter (DAC) 217.

The video decoder 209 decodes pictures from the encoded video elementary stream and stores the pictures in frame buffers 219. The video decoder 209 may comprise a CABAC decoding engine, in accordance with an embodiment of the present invention. Decoding by the video decoder 209 is performed on a syntax element-by-element basis for all video data layers. Non-video data layers, such as headers (picture, sequence or slice headers), are not decoded by the CABAC decoding engine in the case of video streams that do not use CABAC for headers.

Figure 3:
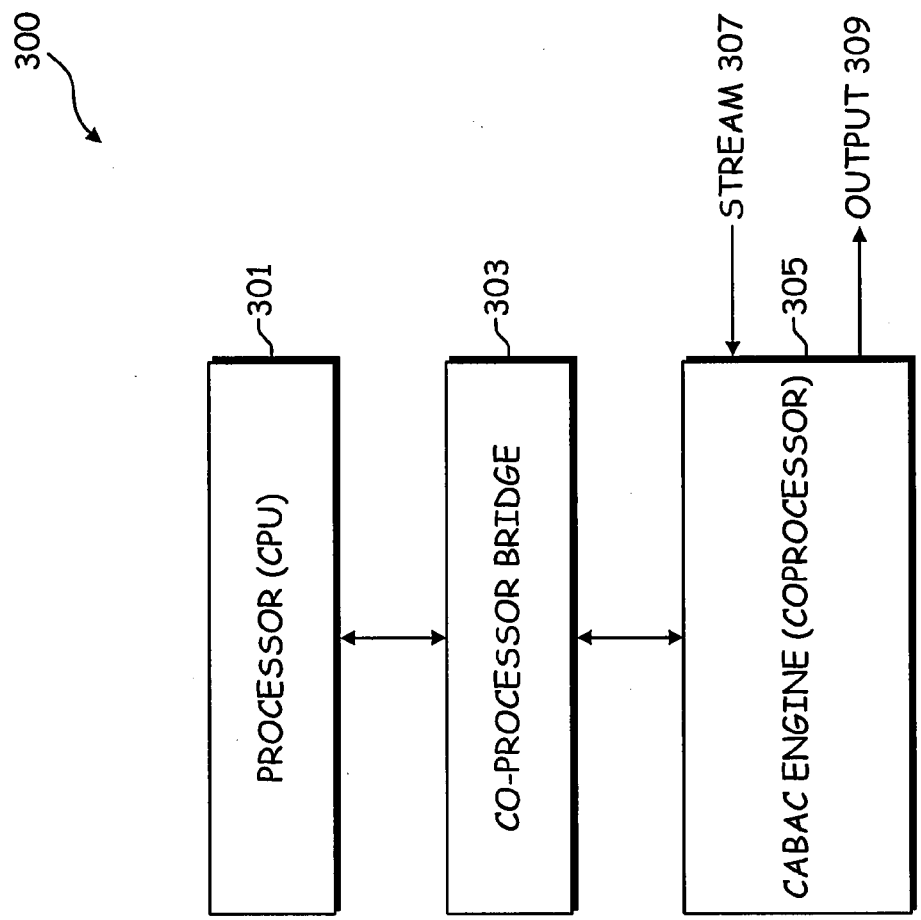
FIG. 3 is a simplified functional diagram of an Entropy decoder circuit, in accordance with an embodiment of the invention.

FIG. 3 is a simplified functional diagram of an entropy decoder circuit 300, in accordance with an embodiment of the present invention. The illustrated entropy decoder circuit 300 comprises a processor (CPU) 301, a co-processor bridge 303, and a CABAC engine co-processor 305. The CPU 301 issues commands related to the encoded video stream 307, which is received by the CABAC engine 305. The commands issued by the CPU 301 are communicated to the CABAC engine 305 via the co-processor bridge 303. After the video stream is decoded, the output 309 may be communicated from the CABAC engine 305 to another circuit, or it may also be communicated back to the CPU 301 via the co-processor bridge 303.

Figure 4:
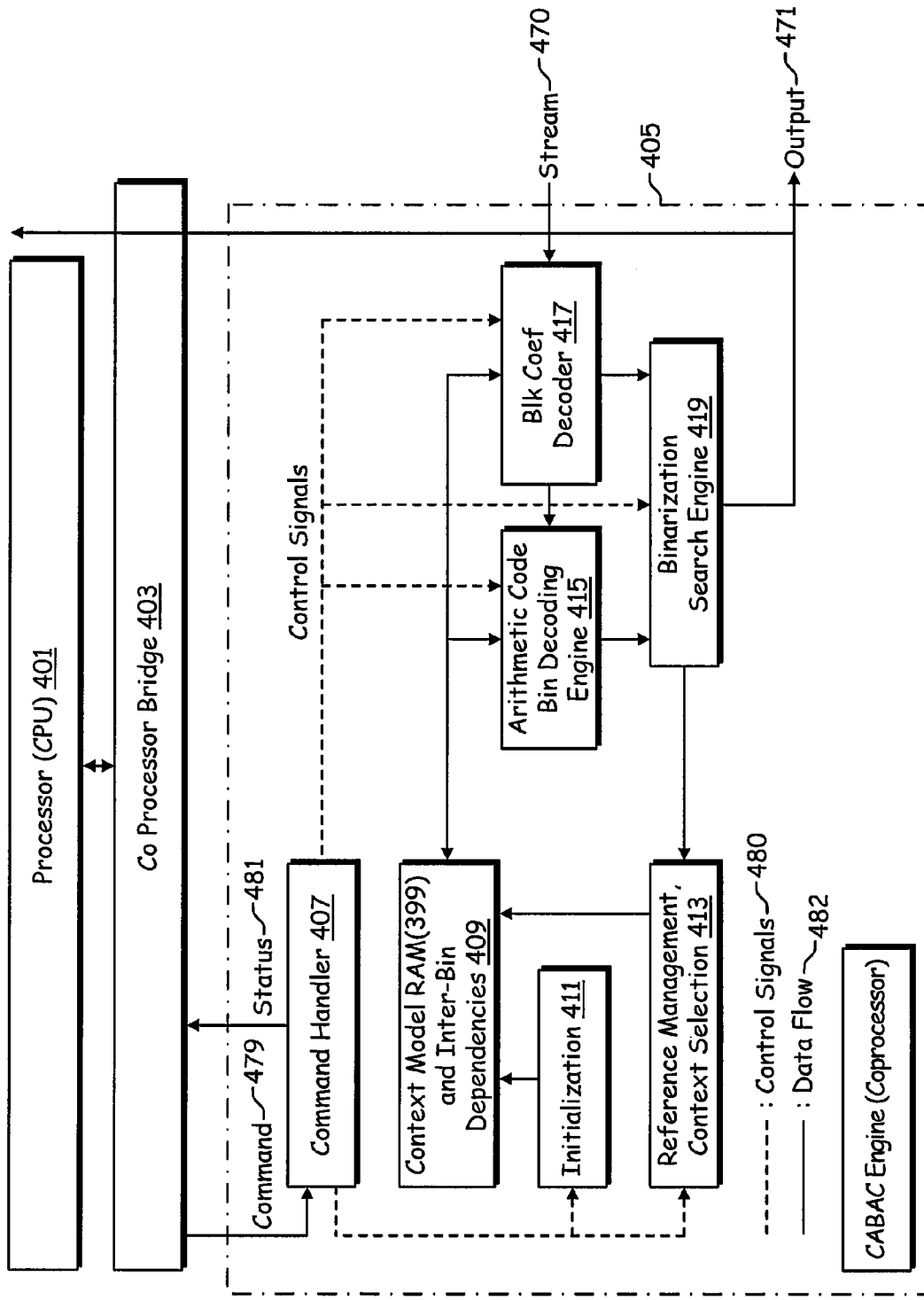
FIG. 4 is a functional diagram of a CABAC decoding engine in the decoder circuit of FIG. 3, in accordance with an embodiment of the invention.

Referring now to FIG. 4, there is illustrated a functional diagram of a CABAC decoding engine 405 in the decoder circuit of FIG. 3, in accordance with an embodiment of the present invention. Commands 479 are provided by the CPU 401, which communicates with the CABAC engine 405 through the co-processor bridge 403. The CPU 401 provides the necessary parameters and starts the CABAC engine 405. The decoded results are either returned to the Processor or stored in memory for further processing. The decoded results can either be used directly by other decoding processes or can be converted into another format, such as a variable length code format. An exemplary method and system for transcoding an entropy coded bitstream into a variable length format is more fully described in U.S. patent application Ser. No. 10/273,515, filed on Oct. 18, 2002, entitled "System and Method for Transcoding Entropy-Coded Bitstreams," which is incorporated herein by reference in its entirety.

The CABAC engine 405 comprises modules, which perform different functions required by CABAC and AVC. More specifically, the CABAC engine 405 comprises a command handler 407, a block coefficient decoder 417, an arithmetic code bin decoding engine (ACBDE) 415, a binarization search engine 419, a reference management and context selection (RMCS) module 413, an initialization module 411, and a context model RAM 409.

The commands 479 issued by the CPU 401 are received by the command handler 407. The command handler 407 decodes the CPU commands 479 and sends appropriate control signals 480 to the other CABAC engine modules. After processing the command 479, the command handler 407 provides a status information 481 back to the CPU 401. The status 481 may provide, for example, a confirmation that the command 479 has been executed, a decoded value from the received video stream 470, or both. After the command handler 407 communicates the status 481, it may proceed with receiving the next command from the CPU 401.

The incoming video stream 470 goes into either the block coefficient decoder 417 or to the ACBDE 415. The CPU 401 determines the class of the elements in the bit stream 470. In order to do that, the CPU 401 may read previously decoded syntax elements. Based on the different classes of syntax elements that are presented in the bit stream 470, the CPU 401 issues an appropriate command 479, which activates either the block coefficient decoder 417 or the ACBDE 415. Subsequent initialization on the block coefficient decoder 417 and the ACBDE 415 is performed by the initialization unit 411. After initialization, bits are taken from the incoming stream 470, as needed, for decoding. In order to decode the received bits, the block coefficient decoder 417 or to the ACBDE 415 utilize probability context models stored on the context model RAM 409.

There are 399 probability context models in the current version of the AVC draft standard, which are associated with many syntax elements and bins within them for a given encoded video stream. At the start of a slice, the context model is initialized using a fixed algorithm using the QP value of the slice in calculating the initial values for the context models, according to the CABAC specification in AVC. All 399 context models, each composed of a "state" value and Most Probable Symbol (MPS) value (the latter is a single bit), are stored locally in the context model RAM 409, which may be a static RAM of 399 entries. The "state" variable uses 6 bits. Therefore, the context model RAM 409 needs 399 entries, each being 7 bits wide, with additional bits whose function will be described later.

Each context stored on the context model RAM 409 is initialized by the initialization module 411 to a preset value, that is set as the standard, at the start of the decoding process of a unit of encoded video stream data, such as a slice. As bins from the encoded video stream 470 are received by the CABAC engine 405 and decoded by the ACBDE 415 or the block coefficient decoder 417, the decoded values are used to modify the context model. Probabilities are then modified dynamically according to the actual data being communicated. When another subsequent bin from the same class is being decoded, the modified context model is used and, if necessary, a further update to the context model is performed at that time. This process continues in the CABAC engine 405 until the end of the entire sequence of encoded bins is reached. At that time, all context models stored in the context model RAM 409 are reset to their standard preset value.

Initializing all the 399 context models in software is a tedious and time-consuming task since calculations have to be done for each context and the calculated result has to be written to the Context Model RAM 409 holding the context models. If a slice is short and, as a result, the time between slices is short, then the percentage of time spent performing initialization in software would be quite large. Therefore, the initialization function is implemented using a hardwired block, the initialization module 411, and a context model is initialized (including the calculations) at the rate of one context every clock cycle.

The core function of the ACBDE 415 is to perform the arithmetic-decoding algorithm pursuant to the AVC Standard. The ACBDE module decodes a bin using a context model provided as input and updates the context model at the end of the decoding process. All this happens within one operating clock cycle. The CABAC internal variables pursuant to the AVC Standard are maintained inside the ACBDE 415 and are updated when a bin is decoded. This block may be hardwired and is the basic functional module to support decode of a generic AVC CABAC syntax element.

If the block coefficient decoder 417 is selected for decoding by the CPU 401, the decoding process speed is increased as a complete block of coefficients is decoded using a single command from the CPU 401. This is possible because context selection for all the coefficients within a block depends only on the macro-block type, the block index and the decoded syntax elements within the block. Being able to decode a whole block in one command can dramatically reduce the overall decoding time because of the low degree of involvement by the processor.

Once the bins have been decoded by the block coefficient decoder 417 or the ACBDE 415, the bins are communicated to the binarization search engine 419, where bins are converted to the corresponding syntax elements, or symbols. The binarization search engine 419 works together with the ACBDE 415 and the block coefficient decoder 417 to appropriately terminate the syntax element decoding process by comparing the decoded bins to a set of binarization codes and determining whether a valid code word has been decoded. Each syntax element may have a different set of binarization codes. The binarization search engine 419 may be a hard-wired block in order to support all AVC CABAC syntax element binarization schemes.

In some cases, several decoded bins may be converted by the binarization search engine 419 to only one syntax element. In other cases, only one bin may correspond, and be converted to by the binarization search engine 419, to one syntax element. The binarization search engine 419 determines the exact number of bins that have to be converted for each corresponding class of syntax elements.

After decoding a given bin, the binarization search engine 419 updates the RMCS module 413 with an updated context model for that bin. The binarization search engine 419 then continues converting all the remaining bins for a specific class of a syntax element, and after all the bins from the specific class have been converted, it performs any necessary update to the corresponding context model via the RMCS module 413 so that it may be used in subsequent decoding of bins from the same class. The final decoded symbol may be transmitted as an output 471, or may be sent back to the CPU 401 in the status data flow 481.

There are two modes, in which the CABAC engine 405 performs decoding—a generic syntax element decoding mode and a group syntax element decoding mode. These modes correspond to different types of commands issued by the CPU 401.

In the generic syntax element mode, the CABAC engine 405 decodes and parses one syntax element at a time. This function utilizes the generic or common resource in the engine because all generic syntax elements are encoded in a similar manner. The CPU 401 provides the parameters needed by the CABAC engine 405 to decode the expected syntax element. The CABAC engine 405 then decodes the whole syntax element in one command without further involvement from the CPU 401. That is, all the bins associated with that syntax element are decoded in one hardware operation. The generic syntax element mode may be performed, for example, by an arithmetic code bin decoding engine, such as the ACBDE 415 of FIG. 4.

In the group syntax element mode, the CABAC engine 405 decodes and parses one or more syntax elements using dedicated decoding control logic in addition to the common resource utilized for decoding generic syntax elements. The CPU 401 provides the parameters needed by the CABAC engine 405 to enable it to perform this decoding function without the intervention by the CPU 401. The group syntax element-decoding mode involves decoding of multiple syntax elements by the CABAC engine 405 in response to one command from the CPU 401. Some of these syntax elements are present only if the previously decoded syntax elements having certain specific values. This condition check is also performed by the CABAC engine 405. The group syntax element mode may be performed, for example, by a block coefficient decoder, such as the block coefficient decoder 417 of FIG. 4.

All the syntax elements in an encoded video stream 470, whether they are decoded using the generic syntax element decoding mode or the group syntax element decoding mode, can be classified into two categories: syntax elements without inter-bin dependencies and syntax elements with inter-bin dependencies.

The category of syntax elements without inter-bin dependencies does not have inter-bin dependencies. That is, the context selection of the succeeding bins of this type of syntax element does not depend on the already decoded bins. Typically in this case, there are multiple contexts to select from for the first bin, and there is only one possible context for each of the other bins.

In the AVC standard, the syntax elements that fall into this category are:
mb_skip
sub_mb_type_P
abs_mvd_h
abs_mvd_v
ref_idx
delta_qp
ipred_chroma
coded_block_flag
coeff_sig
coeff_last
Each bin of cbp_luma
Each bin of cbp_chroma
ipred_mpm, ipred_rm For this type of syntax element, contexts provided in the AVC standard context tables are re-arranged in such a way that all contexts for the syntax elements listed above are directed to auto-index to another context and the resulting contexts are stored in the context model memory. The context for the first bin is calculated by the CABAC engine 405, and using the auto-index feature it derives the contexts for all other bins for the syntax element. The detailed operations are as follows:

Firmware (FW), running on the CPU 401, issues a CABAC syntax-element decode command 479 to the CABAC Engine 405 to initiate the decoding process of the syntax element.

The command handler 407 decodes the command. Based on the syntax element type, it determines if there are multiple contexts associated with the first bin of that syntax element. If so, it uses the reference management/context calculation engine to calculate the context of the first bin using the adjacent block/macro-block information. If the first bin uses a fixed context, then it selects the starting context value and continues with the rest of the decoding process.

CABAC Engine decodes the first bin of the syntax element.

Each entry in the context model RAM 409 has a field pointing to another entry in the memory. If more bins are to be decoded (after checking the current state of decoding against the binarization scheme of the syntax element), the CABAC Engine 405 uses the pointer to retrieve the context for the subsequent bin. Each context model entry also has a field indicating the range of bins to which the context model is applied. Using this information, the CABAC Engine 405 can properly jump to another context model when finished decoding one bin. This process repeats for all bins and context model selections of the syntax element.

The CABAC Engine 405 continues decoding other bins until all bins of the syntax element are decoded based on the comparison performed of the decoded bins and the expected bins by the binarization search engine 419.

At the end of decoding of a syntax element, the decoded reference is stored in the reference management engine for use in decoding of adjacent blocks or macro-blocks.

When more than one bin involves context selection based on the properties of an adjacent block or MB, the CPU 401 issues separate commands to the CABAC engine 405 to perform bin-by-bin decoding of these syntax elements. Each bin of these syntax elements, for example cbp_luma and cbp_chroma, is treated as a separate syntax element in order to fit into this classification.

The second type of syntax elements is syntax elements with inter-bin dependencies. These syntax elements possess the properties that contexts for their bins after the first bin cannot be determined until previous bins have been decoded. The syntax elements in the AVC standard that fall into this category are:

mb_type_I, mb_type_P and mb_type_B
sub_mb_type_B
coeff_abs_level

A hardwired block is used for these syntax elements because the dependencies involved in context selection for bins other than the first one are contained within the syntax element. For example, in the syntax element in mb_type, the context models for bins other than the first bin are determined by the earlier bins in the same mb_type syntax element, and they are not affected by information outside that syntax element. This property makes the hardwired block practical, and relatively simple compared to the case when outside information has to be handled and processed.

The hardwired functions for these syntax elements are similar to the ones without inter-bin dependencies except that the context selections for later bins are determined by hardware, depending on the decoded values of earlier bins.

There are certain syntax elements, for which multiple contexts are provided for certain bins and the CABAC engine 405 determines which context to use. The selection of the appropriate context is based on previously decoded values in adjacent blocks or macro-blocks. In such cases, the spatially adjacent left and top block, or macro-block values, are used to calculate the context to be used for the decoding of a bin pursuant to the AVC Standard. For selecting the adjacent block or macro-block, the adaptive frame-field (AFF) properties of the different blocks need to be considered.

The reference management and the context calculation are hardwired because performing these functions in firmware would require a lot of storage and complex manipulation of references, which require a large number of processor cycles and memory access cycles as well as memory space.

A macroblock (MB) pair (pursuant to the AVC standard) contains two macroblocks, top and bottom. When syntax elements belonging to a macroblock (which in turn belongs to a macroblock pair) are being decoded, syntax elements from spatially adjacent (top and left) macroblock pairs are used for reference calculation. The macroblock pair from which syntax elements are being decoded is referred to as the current macroblock pair.

Figure 5:
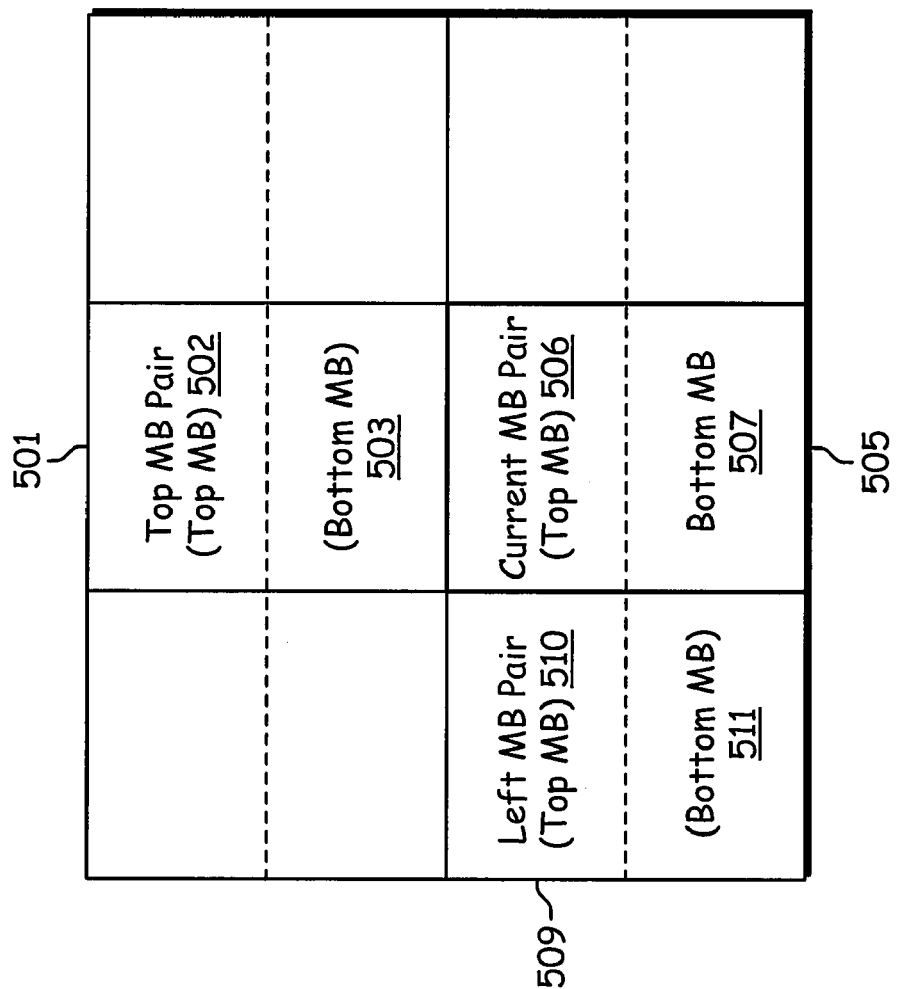
FIG. 5 is a block diagram of neighboring macroblocks illustrating the use of Macroblock-Adaptive Field-Frame (MB-AFF) coding.

Referring now to FIG. 5, there is illustrated a block diagram describing the spatial location of the left macroblock pair 509 and the top macroblock pair 501 relative to the current macroblock pair 505 that is being decoded, which comprises a top macroblock 506 and a bottom macroblock 507. The CABAC engine maintains references for the spatially left macroblock pair 509 (both macroblocks 510 and 511 within the left MB pair 509) and the spatially top macroblock pair 501 (both macroblocks 502 and 503 within the top MB pair 501). It also stores the current macroblock pair references 505 as the various syntax elements are being decoded. Depending on the adaptive frame-field (AFF) parameters of the adjacent macroblocks 509 and 501, and the current macroblock 505, the spatially adjacent left and top blocks 509 and 501 are selected and the reference values belonging to those blocks are used for further processing. The reference values thus selected are used to calculate the context associated with the bin to be decoded subsequently.

After a spatially adjacent reference is selected, a parameter called condTerm is calculated (as explained in the AVC Standard). "condTerm" is a single bit (either 0 or 1) value, which is calculated based on a condition that is specific for each syntax element.

The following optimizations are performed in order to minimize the storage requirements for the reference buffers.

Wherever possible, the condTerms associated with the reference values are stored, instead of the actual references. The condTerms require only one bit, while the actual decoded value may be up to a few bits.

For the left macroblock pair reference buffer, the reference values corresponding to only the spatially right-most blocks are stored.

For the top macroblock pair reference buffer, the reference values corresponding to only the spatially bottom blocks are stored.

The AVC standard specifies rules for determining the condTerm for each syntax element under situations when a syntax element is not present in a macroblock or when special conditions need to be applied based on the properties of a macroblock or macroblock pair. Referring again to FIG. 4, the performance of the CABAC engine 405 may be further improved. Direct hardwiring of the applicable context selection algorithms described in the AVC specification may lead to lot of additional logic and may make the RMCS module highly complex to build. In another aspect of the invention, many of these rules may be grouped together and the method of managing the references simplified.

The RMCS block in a CABAC engine may be optimized so that decoding functionality may be achieved in accordance with the AVC specification with significantly low complexity, both in terms of area and design/verification complexity. Default values of condTerms may be chosen and the reference buffer initialized to said default values before decoding each macroblock. Such use of default values provides equivalent functionality to many of the said rules specified in the AVC standard. Additional logic may be used to implement the remaining rules in the AVC specification. As a result of such optimization, the complexity of an RMCS block may be reduced.

In another aspect of the invention, an RMCS block may be adapted to process different syntax elements. In this case, the AVC specification may provide rules to the RMCS block for handling specific cases when the neighboring macroblock has certain properties. For example, there may be specific rules provided to the RMCS block if a macroblock is not available or skipped or PCM (pulse code modulated). In addition, the RMCS block may be adapted to process direct macroblocks, intra_4×4 or intra_16×16 macroblocks.

Figure 6A:
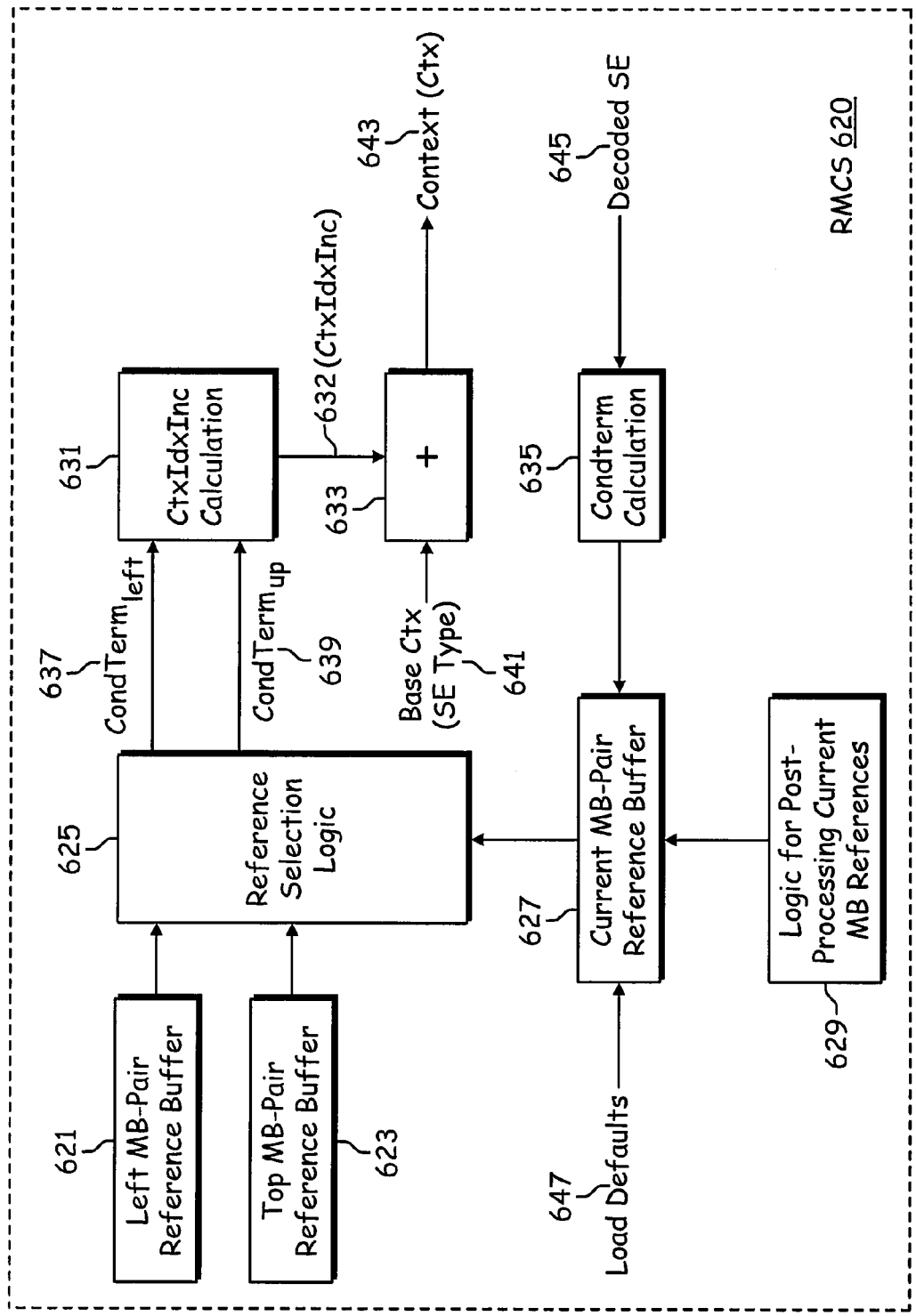
FIG. 6A is a block diagram of reference management and context selection (RMCS) block, in accordance with an embodiment of the invention.

FIG. 6A is a block diagram of reference management and context selection (RMCS) block 620, in accordance with an embodiment of the invention. Referring to FIG. 6A, the RMCS block 620 may comprise a left macroblock (MB) pair reference buffer 621, a top MB pair reference buffer 623, a current MB pair reference buffer 627, a reference selection logic 625, a context index incrementer 631, an adder 633, a condTerm calculation block 635, and a post-processing block 629.

The reference selection logic 625 may comprise suitable logic, circuitry and/or code and may be adapted to receive reference inputs from the left MB pair reference buffer 621, the top MB pair reference buffer 623, and the current MB pair reference buffer 627. After selecting the appropriate left and top references, in a condTerm format or as a previously decoded values, the reference selection logic 625 may generate a condTerm$_{left}$ 637 reference and a condTerm$_{top}$ 639 reference.

The context index incrementer 631 may comprise suitable logic, circuitry and/or code and may be adapted to receive the condTerm$_{left}$ 637 reference and the condTerm$_{top}$ 639 reference generated by the reference selection logic 625 as inputs. The context index incrementer 631 may then calculate the context index incrementer (CtxIdxInc) 632 reference, as defined in the AVC specification. The CtxIdxInc 632 may then be utilized by the adder 633.

The adder 633 may add the calculated CtxIdxInc 632 and a base context value 641 (as defined in the AVC specification for a given class of syntax elements) to obtain the final context value 643. The final context value 643 may be utilized by a CABAC engine, for example, to index a context search RAM 409, for decoding a bin in a given syntax element.

In operation, the current MB pair reference buffer 627 may store the condTerms for a current macroblock pair for all syntax elements within the macroblock pair, for which condTerms are relevant in the AVC CABAC specification. At the start of decoding a macroblock, or macroblock pair, default values 647 for the condTerms may be loaded into the current MB pair reference buffer 627 for all syntax elements. At the start of decoding a macroblock pair, the hardware loads the default values for condTerms for all syntax elements for which condTerms are needed for CABAC decoding. The condTerm reference values for a left-adjacent and top-adjacent macroblocks may be buffered into the left MB pair reference buffer 621 and top MB pair reference buffer 623, respectively, and then loaded into the reference selection logic 625.

The condTerm value for an mb_field_decoding_flag syntax element may require calculation based on the whether the left and top neighboring macroblock pairs comprise a mb_field_decoding_flag or not. Such calculation may be performed together with the initial loading of the default values 647 to determine the condTerm value associated with an mb_field_decoding_flag syntax element. For syntax elements that may require storing of the decoded value, a not_available flag may be set. If such syntax element is decoded in the bit stream, the not_available flag may be cleared. This process may be utilized for an ref_idx syntax element in the AVC specification.

The reference selection logic may then select the condTerm$_{left}$ 637 reference and the condTerm$_{top}$ 639 reference utilizing a left MB pair reference, a top MB pair reference and a current MB pair reference. The condTerm$_{left}$ 637 reference and the condTerm$_{top}$ 639 reference may be communicated to the context index incrementer 631 to generate the CtxIdxInc 632. The CtxIdxInc 632 may be added to a base context value 641 within the adder 633 to obtain a final context value 643. The final context value 643 may be utilized during decoding of a current syntax element within a current MB pair.

After decoding within the CABAC decoding engine, the decoded syntax element 645 may be communicated back to the RMCS 620. The condTerm calculation block 635 may utilize the decoded syntax element 645 to calculate condTerm values for one or more of the remaining syntax elements within the current MB pair stored in the current MB pair reference buffer 627. If a condTerm value for a given syntax element within the current MB pair may not be updated utilizing the decoded syntax element 645, the loaded default reference value for such syntax element may remain and subsequently be utilized by the reference selection logic 625.

The post-processing block 629 may be enabled by the RMCS 620 during the decoding of a macroblock to modify the references stored in the current MB-pair reference buffer 627. Such post-processing may be required only for syntax elements within the current MB pair that do not follow common condTerm properties according to the AVC specification. For example, based on decoded values of a macroblock type, mb_type, syntax element and mb_skip_flag syntax element, which may indicate whether a macroblock is skipped, the condTerms associated with the cbp_luma, cbp_chroma and coded_block_flag syntax elements may be updated during post-processing within the post-processing block 629.

Figure 6B:
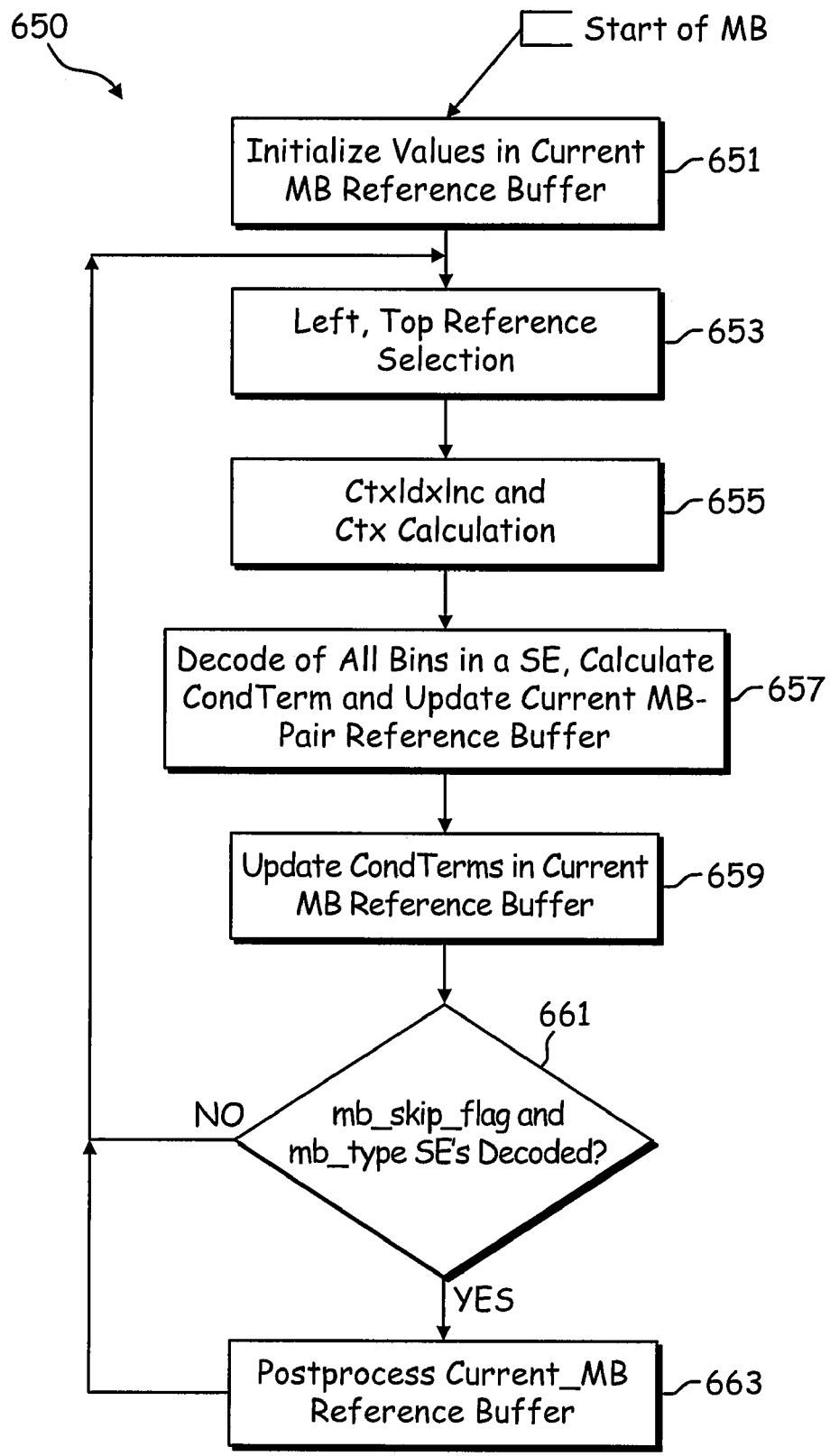
FIG. 6B is a flow diagram of an exemplary method for reference management and context selection, in accordance with an embodiment of the invention.

FIG. 6B is a flow diagram of an exemplary method 650 for reference management and context selection, in accordance with an embodiment of the invention. Referring to FIG. 6B, at 651, values within a current MB pair reference buffer may be initialized. At 653, a left-adjacent and top-adjacent MB pair references may be selected. At 655, a CtxIdxInc value and a final context value may be calculated based on a selected left MB condterm reference, top MB condTerm reference and a current MB condTerm reference for a current syntax element. At 657, all bins for a syntax element may be decoded utilizing the final context value. After decoding of the syntax element, condTerm values for the remaining syntax elements within the current MB pair may be updated at 659. At 661, it may be determined whether mb_skip_flag and mb_type syntax elements have been decoded. If mb_skip_flag and mb_type syntax elements have not been decoded, a decoding of a subsequent syntax element may resume at 653. If mb_skip_flag and mb_type syntax elements have been decoded, the current MB reference buffer may be post-processed.

Figure 6C:
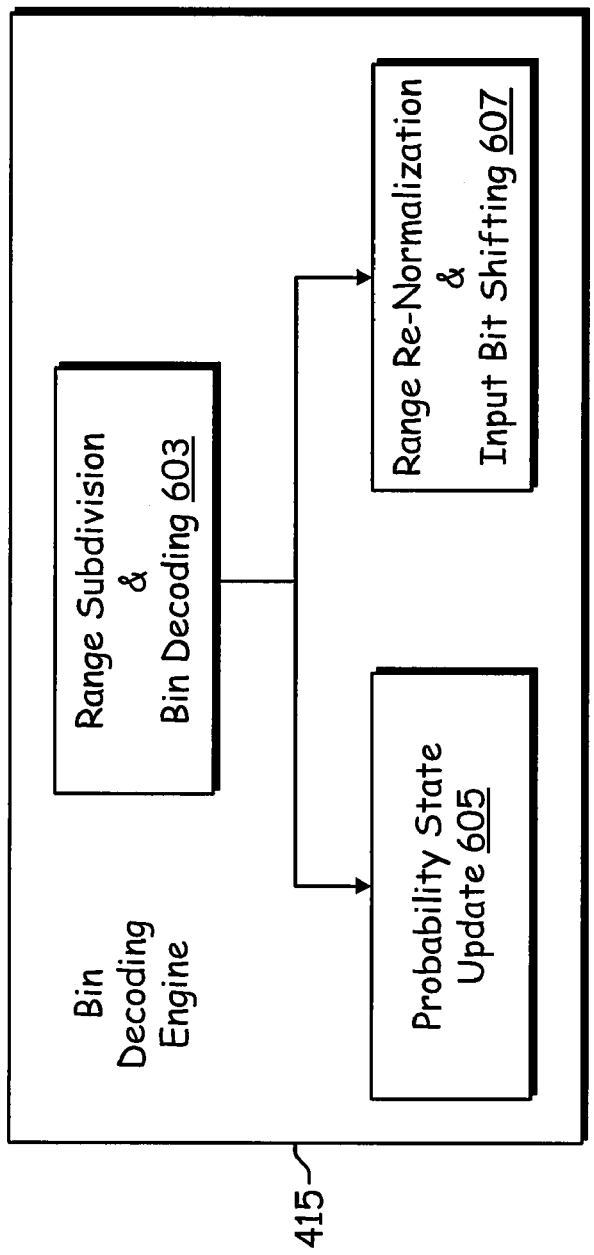
FIG. 6C is a functional diagram of a bin decoding engine, in accordance with an embodiment of the present invention.

Referring to FIG. 6C, there is illustrated a block diagram of the ACBDE 415 of FIG. 4, in accordance with an embodiment of the present invention. There are three distinct operations performed in the ACBDE 415: range subdivision with bin decoding 603, probability state update (or estimation) 605, and range re-normalization with associated input bit shifting 607. The result of the first action (603) drives the latter two (605 and 607).

Complexity per bin decoding is as follows:

Range Subdivision with Bin Decoding 603: Three subtractions, one table lookup (64 entries), and two comparisons.

Probability State Update 605: One table lookup (there are three tables to select from depending on the decoded bin and slice type).

Range Re-Normalization with associated Input Bit Shifting 607: One comparison.

All above functions are preferably performed in one H/W execution cycle. In addition, range interval variables are maintained in the ACBDE 415 and are initialized at each slice start. In this regard, a hardware execution cycle refers to the time period required for the hardware to complete its processing task and does not mean a clock cycle.

Figure 7:
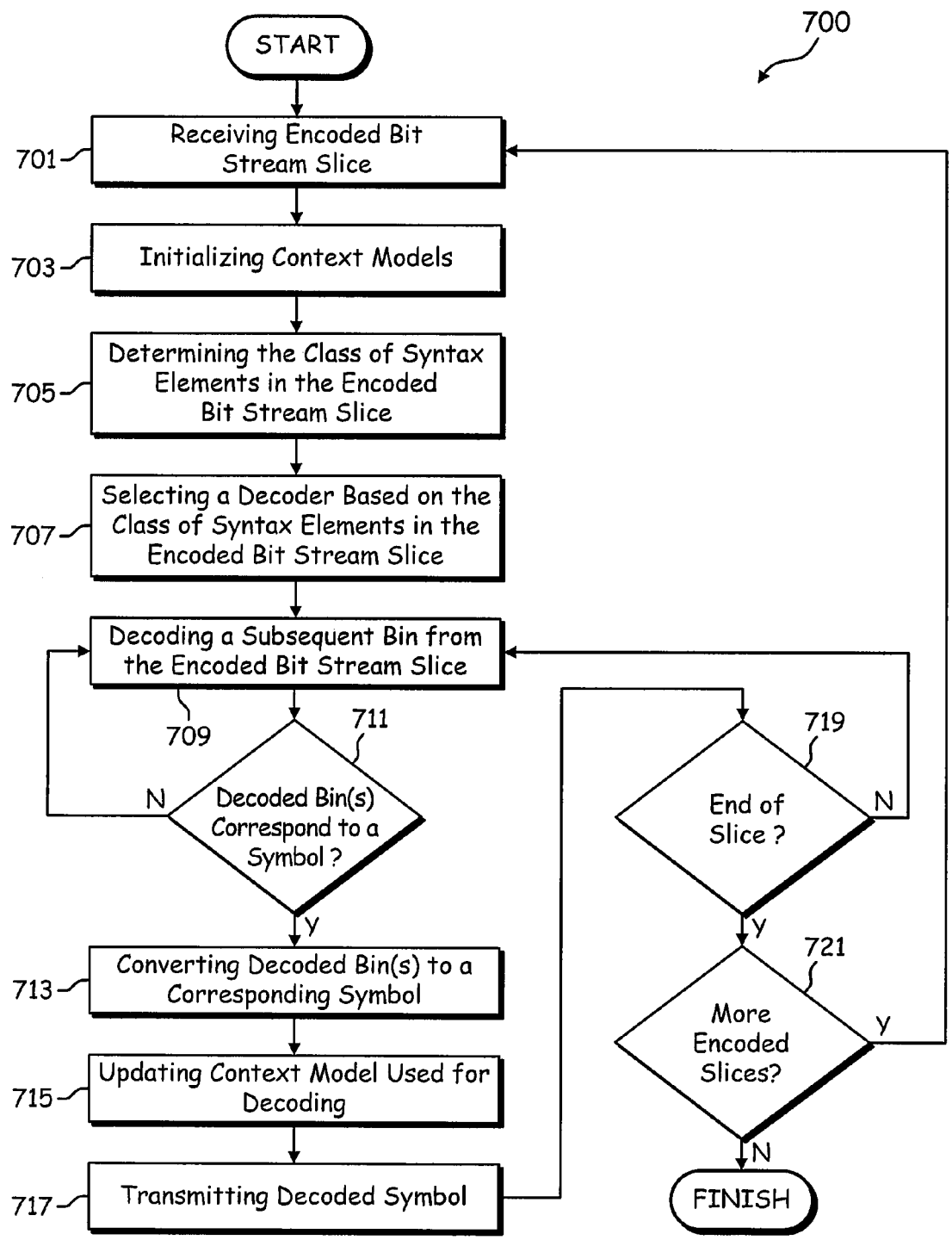
FIG. 7 is a flow diagram of a method for arithmetic decoding, in accordance with an embodiment of the present invention.

Referring now to FIG. 7, there is illustrated a flow diagram of a method 700 for arithmetic decoding, in accordance with an embodiment of the present invention. At 701, encoded bit stream is received by the CABAC engine. The context models in the context model RAM are initialized to their preset value at 703. The CPU may then determine the class of syntax elements in an encoded bit stream slice, at 705. Depending on the class of syntax elements determined by the CPU, a decoder is selected at 707. The selected decoder may be, for example, an arithmetic code bin decoding engine, or a block coefficient decoder. At 709, the selected decoder decodes a bin from the encoded bit stream slice. At query 711, it is determined whether the decoded bin, or bins, so far correspond to a symbol. If it does not, then 709 is repeated. If it does, then the decoded bin, or bins, is converted to a corresponding symbol at 713. The context model, which was used in the decoding process by the decoder, is updated at 715. At 717 the decoded symbol may be transmitted to another circuit, or back to the CPU, or both. At query 719, it is determined whether the end of the encoded slice is reached. If the slice has not been completed, then the decoding continues with the next bin, at 709. If the end of a slice has been reached, a query 721 determines whether there are additional encoded slices in the received bit stream. If there are additional encoded slices that need to be decoded, the encoded bit stream slice is received at 701.

Although the foregoing embodiments are described in the context of the AVC standard, it should be noted that the present application is not limited to the AVC standard and is applicable in other situations where compressed video that uses CABAC coding method is to be decoded and displayed.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for selecting contexts during decoding of arithmetic code, the method comprising:
performing by one or more processors and/or circuits integrated within a single chip:
assigning a plurality of default context identifiers to a plurality of current syntax elements within a current macroblock;
acquiring a plurality of adjacent context identifiers, said plurality of adjacent context identifiers associated with a plurality of syntax elements within at least one macroblock adjacent to said current macroblock; and
selecting at least one of said plurality of adjacent context identifiers utilizing at least one of said plurality of default context identifiers.

2. The method according to claim 1, wherein each of said plurality of default context identifiers comprises a binary value.

3. The method according to claim 1, comprising acquiring a top-adjacent context identifier associated with a syntax element within a top-adjacent macroblock to said current macroblock.

4. The method according to claim 1, comprising acquiring a left-adjacent context identifier associated with a syntax element within a left-adjacent macroblock to said current macroblock.

5. The method according to claim 1, comprising generating a final context identifier utilizing said selected adjacent context identifiers.

6. The method according to claim 5, comprising decoding at least one of said plurality of current syntax elements utilizing said generated final context identifier.

7. The method according to claim 6, comprising generating a current context identifier for said decoded current syntax element.

8. The method according to claim 6, comprising post-processing said plurality of default context identifiers, if said decoded current syntax element comprises an mb_skip_flag or mb_type syntax element.

9. The method according to claim 6, comprising updating said plurality of default context identifiers for at least one of cbp_luma, cbp_chroma and coded_block_flag syntax elements, if said decoded current syntax element comprises an mb_skip_flag or mb_type syntax element.

10. The method according to claim 7, comprising updating said plurality of default context identifiers utilizing said generated current context identifier.

11. A computer-readable medium having stored thereon, a computer program having at least one code section for selecting contexts during decoding of arithmetic code, the at least one code section being executable by a computer for causing the computer to perform steps comprising:
assigning a plurality of default context identifiers to a plurality of current syntax elements within a current macroblock;
acquiring a plurality of adjacent context identifiers, said plurality of adjacent context identifiers associated with a plurality of syntax elements within at least one macroblock adjacent to said current macroblock; and
selecting at least one of said plurality of adjacent context identifiers utilizing at least one of said plurality of default context identifiers.

12. The computer-readable medium according to claim 11, wherein each of said plurality of default context identifiers comprises a binary value.

13. The computer-readable medium according to claim 11, comprising code for acquiring a top-adjacent context identifier associated with a syntax element within a top-adjacent macroblock to said current macroblock.

14. The computer-readable medium according to claim 11, comprising code for acquiring a left-adjacent context identifier associated with a syntax element within a left-adjacent macroblock to said current macroblock.

15. The computer-readable medium according to claim 11, comprising code for generating a final context identifier utilizing said selected adjacent context identifiers.

16. The computer-readable medium according to claim 15, comprising code for decoding at least one of said plurality of current syntax elements utilizing said generated final context identifier.

17. The computer-readable medium according to claim 16, comprising code for generating a current context identifier for said decoded current syntax element.

18. The computer-readable medium according to claim 16, comprising code for post-processing said plurality of default context identifiers, if said decoded current syntax element comprises an mb_skip_flag or mb_type syntax element.

19. The computer-readable medium according to claim 16, comprising code for updating said plurality of default context identifiers for at least one of cbp_luma, cbp_chroma and coded_block_flag syntax elements, if said decoded current syntax element comprises an mb_skip_flag or mb_type syntax element.

20. The computer-readable medium according to claim 17, comprising code for updating said plurality of default context identifiers utilizing said generated current context identifier.

21. A system for selecting contexts during decoding of arithmetic code, the system comprising:
at least one processor that assigns a plurality of default context identifiers to a plurality of current syntax elements within a current macroblock;
a selector that acquires a plurality of adjacent context identifiers, said plurality of adjacent context identifiers associated with a plurality of syntax elements within at least one macroblock adjacent to said current macroblock; and said selector selects at least one of said plurality of adjacent context identifiers utilizing at least one of said plurality of default context identifiers.

22. The system according to claim 21, wherein each of said plurality of default context identifiers comprises a binary value.

23. The system according to claim 21, wherein said selector acquires a top-adjacent context identifier associated with a syntax element within a top-adjacent macroblock to said current macroblock.

24. The system according to claim 21, wherein said selector acquires a left-adjacent context identifier associated with a syntax element within a left-adjacent macroblock to said current macroblock.

25. The system according to claim 21, comprising a context generator that generates a final context identifier utilizing said selected adjacent context identifiers.

26. The system according to claim 25, comprising a decoder that decodes at least one of said plurality of current syntax elements utilizing said generated final context identifier.

27. The system according to claim 26, wherein said at least one processor generates a current context identifier for said decoded current syntax element.

28. The system according to claim 26, comprising a post-processor that post-processes said plurality of default context identifiers, if said decoded current syntax element comprises an mb_skip_flag or mb_type syntax element.

29. The system according to claim 26, wherein said post-processor updates said plurality of default context identifiers for at least one of cbp_luma, cbp_chroma and coded_block_flag syntax elements, if said decoded current syntax element comprises an mb_skip_flag or mb_type syntax element.

30. The system according to claim 27, wherein said post-processor updates said plurality of default context identifiers utilizing said generated current context identifier.

* * * * *

UNITED STATES PATENT AND TRADEMARK OFFICE
CERTIFICATE OF CORRECTION

PATENT NO. : 7,630,440 B2 Page 1 of 1
APPLICATION NO. : 10/897546
DATED : December 8, 2009
INVENTOR(S) : Ramkumar Prakasam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Second Day of November, 2010

David J. Kappos
*Director of the United States Patent and Trademark Office*